UNITED STATES PATENT OFFICE.

JOSEPH WILKINS, OF BALTIMORE, MARYLAND.

IMPROVEMENT IN SEPARATING ANIMAL FROM VEGETABLE FIBERS IN MIXED FABRICS.

Specification forming part of Letters Patent No. 214,222, dated April 8, 1879; application filed November 29, 1878.

*To all whom it may concern:*

Be it known that I, JOS. WILKINS, of Baltimore city, State of Maryland, have invented certain new and useful Improvements in Processes of Treating Mixed Fiber; and I hereby declare the same to be fully, clearly, and exactly described as follows:

In Letters Patent of the United States No. 203,230, granted to me April 30, 1878, is described a process of separating animal from vegetable fiber in mixed fabrics, the said process consisting in treating the fabric with a free mineral acid (preferably sulphuric) in presence of a mordant; the object being to prevent a discharge of the dye of the fabric and consequent contamination of the bath.

In Letters Patent of the United States No. 203,231, also dated April 30, 1878, is described a process for accomplishing the same end, consisting in wetting the fabric with acid and subjecting it to dry heat; the object there being to lessen the deleterious effect of the acid upon the animal fiber, which effect is more or less marked in proportion to the degrees of heat used and of concentration of the bath.

My present invention consists in the following process, whereby all the above-named advantages are secured, and also others which, by the processes named, as well as by others of the same general nature hitherto known, were unattainable.

This invention consists in heating the rags with a mordanting persalt of a mineral acid, and subsequently washing and agitating for the separation of the vegetable matter, and carding the reclaimed woolen fiber.

It is well known that the wool reclaimed from mixed fabrics by the processes heretofore employed has a dark or brownish hue, due to the admixture of fibers of all the various colors present in the rags, while that recovered from white rags would be, of course, free from color and of a much greater commercial value.

To separate the rags before treatment would involve the use of two baths, whereas a process which wholly prevents discharge of color would enable the operator to pick out the white rags from the mixed mass after treatment in the same bath. This result attends the use of my present invention, which is carried out as follows: I prepare a bath of a persalt of a mordanting metal, sesquisulphate of alumina being preferred, dissolved in pure water, a nearly-saturated solution being used. The rags are immersed therein until thoroughly wetted, and are then quickly dried at as high a temperature as is possible without injuring the wool. They are then picked over for the purpose of separating the white rags from the colored ones, which are subsequently washed, and the disintegrated vegetable fiber is removed by agitation in a suitable beating apparatus. Finally, the wool is carded and sent into commerce.

It is obvious that by the process described all deleterious acid action upon the animal fiber is obviated, as well as the contamination of the bath or of the white rags by the dye from the colored ones.

Having thus described my invention, what I claim as new, and desire to secure by Letters Patent, is—

1. The process herein described of treating mixed fiber, consisting in subjecting it to the action of a bath of a mordanting persalt of a mineral acid with heat, and separating the thereby disintegrated vegetable fiber, substantially as described.

2. The process herein described of treating mixed fiber, consisting in treating the same with a solution of sesquisulphate of alumina, heating, washing, and agitating, substantially as set forth.

JOS. WILKINS.

Witnesses:
R. D. WILLIAMS,
C. E. SIMMONS.